(12) United States Patent
Filler et al.

(10) Patent No.: US 9,603,767 B1
(45) Date of Patent: Mar. 28, 2017

(54) CREMAINS STORAGE ASSEMBLY

(71) Applicants: Thomas Filler, Oxford, NC (US); Tina Filler, Oxford, NC (US)

(72) Inventors: Thomas Filler, Oxford, NC (US); Tina Filler, Oxford, NC (US)

( * ) Notice: Subject to any disclaimer, the term of this patent is extended or adjusted under 35 U.S.C. 154(b) by 0 days.

(21) Appl. No.: 15/087,215

(22) Filed: Mar. 31, 2016

(51) Int. Cl.
*A61G 17/08* (2006.01)
*A01K 85/16* (2006.01)
*A01K 97/00* (2006.01)

(52) U.S. Cl.
CPC .............. *A61G 17/08* (2013.01); *A01K 85/16* (2013.01); *A01K 97/00* (2013.01)

(58) Field of Classification Search
CPC ...... A61G 17/08; E04H 13/008; A01K 97/00; A01K 85/16
USPC .................................. 27/1; D99/5; 43/42.35
See application file for complete search history.

(56) References Cited

U.S. PATENT DOCUMENTS

| | | |
|---|---|---|
| D356,421 S | 3/1995 | Parker |
| D418,271 S | 12/1999 | Parker |
| 6,076,292 A * | 6/2000 | Kawa ..................... A61G 17/08 27/1 |
| 6,662,416 B1 | 12/2003 | Huggins |
| 7,308,741 B1 * | 12/2007 | Rydberg ................ A61G 17/08 27/1 |
| 7,526,844 B2 * | 5/2009 | Pearce ................... A61G 17/08 27/1 |
| D650,963 S | 12/2011 | Roberson |
| D703,914 S | 4/2014 | Irvine et al. |
| 8,732,919 B1 | 5/2014 | Malueg-Ray |
| 2010/0212124 A1 | 8/2010 | Denton et al. |

\* cited by examiner

*Primary Examiner* — William Miller

(57) ABSTRACT

A cremains storage assembly includes a fishing lure that may be cast into a body of water. The fishing lure may contain cremains. A sleeve is coupled to the fishing lure and the sleeve may fill the fishing lure with the cremains. A cap is removably coupled to the sleeve and the cap may retain the cremains in the fishing lure.

3 Claims, 3 Drawing Sheets

CREMAINS STORAGE ASSEMBLY

BACKGROUND OF THE DISCLOSURE

Field of the Disclosure

The disclosure relates to storage devices and more particularly pertains to a new storage device for storing cremains in a fishing lure.

SUMMARY OF THE DISCLOSURE

An embodiment of the disclosure meets the needs presented above by generally comprising a fishing lure that may be cast into a body of water. The fishing lure may contain cremains. A sleeve is coupled to the fishing lure and the sleeve may fill the fishing lure with the cremains. A cap is removably coupled to the sleeve and the cap may retain the cremains in the fishing lure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
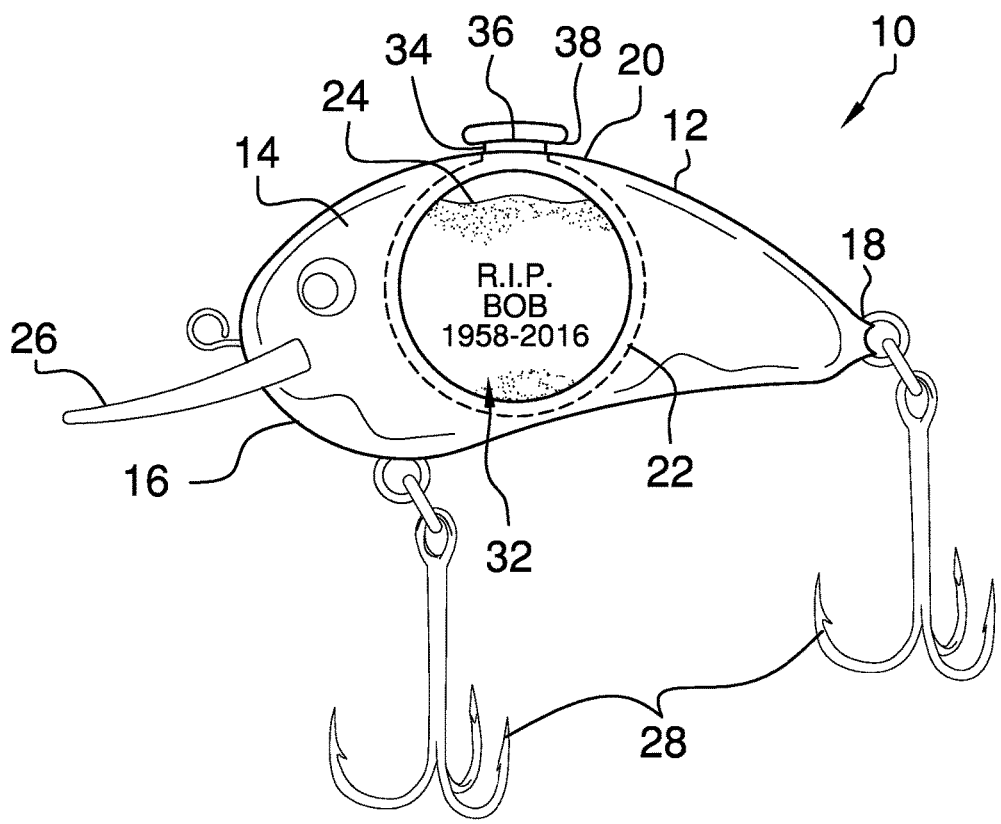
FIG. 1 is a left side view of a cremains storage assembly according to an embodiment of the disclosure.
Figure 2:
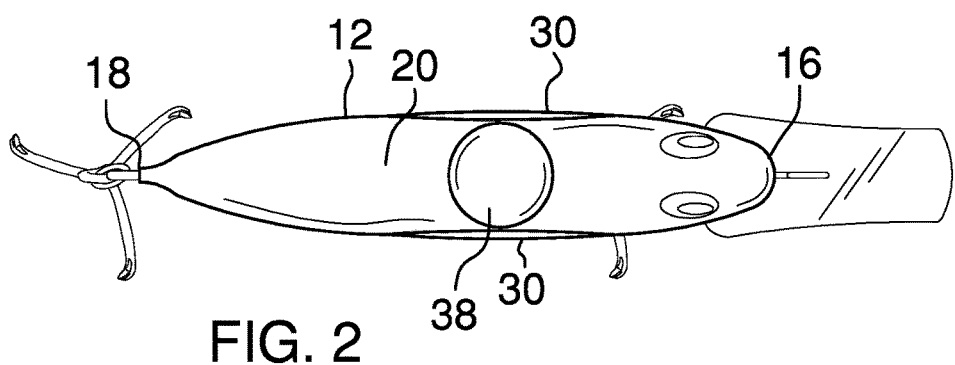
FIG. 2 is a top view of an embodiment of the disclosure.
Figure 3:
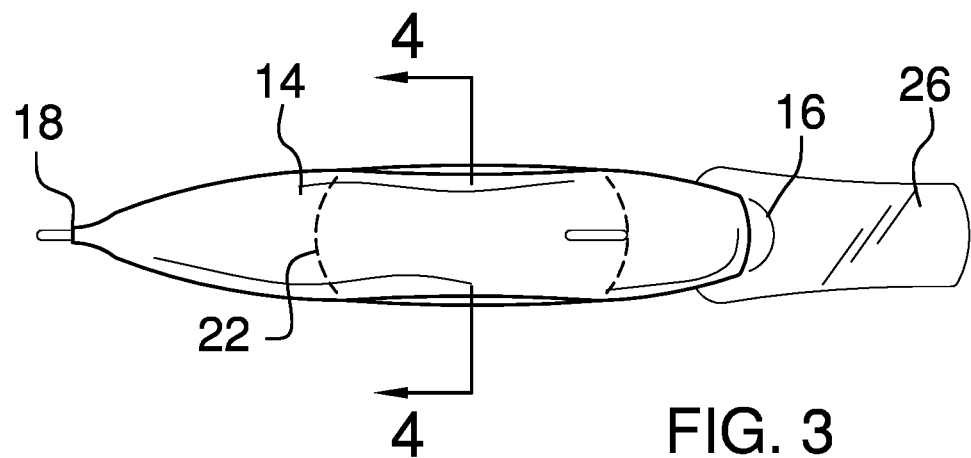
FIG. 3 is a bottom view of an embodiment of the disclosure.
Figure 4:
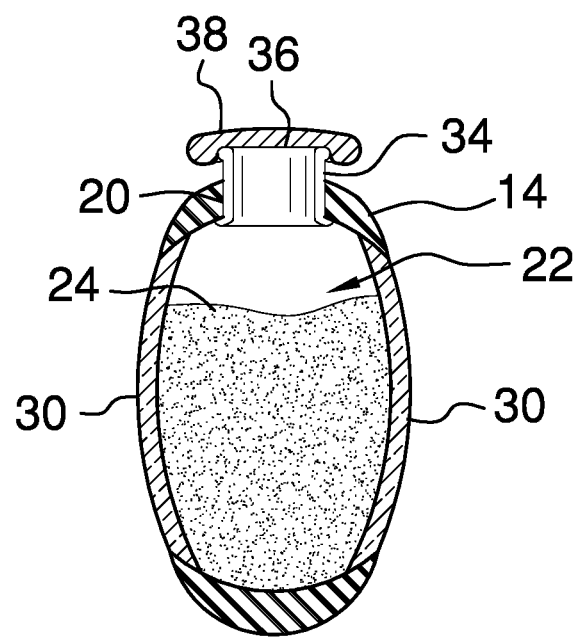
FIG. 4 is a cross sectional view taken along line 4-4 of FIG. 3 of an embodiment of the disclosure.
Figure 5:
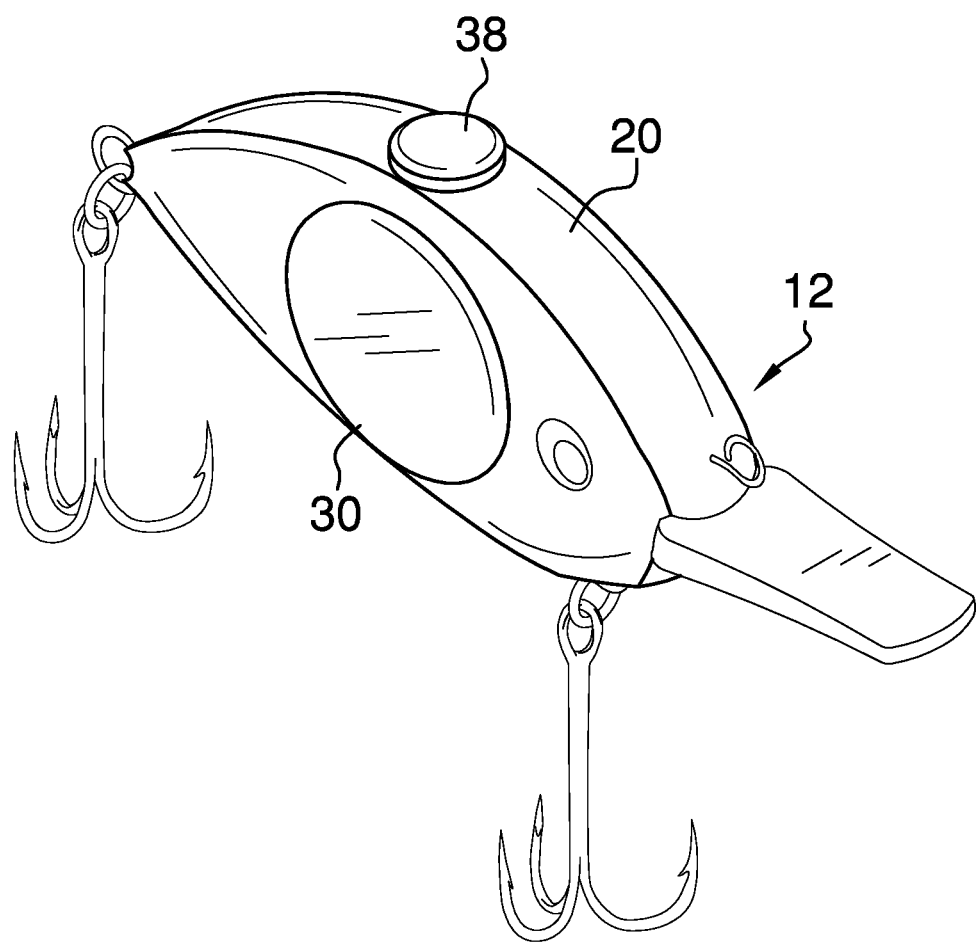
FIG. 5 is a perspective view of an embodiment of the disclosure.

With reference now to the drawings, and in particular to FIGS. 1 through 5 thereof, a new storage device embodying the principles and concepts of an embodiment of the disclosure and generally designated by the reference numeral 10 will be described.

As best illustrated in FIGS. 1 through 5, the cremains storage assembly 10 generally comprises a fishing lure 12 that may be cast into a body of water. The fishing lure 12 has an outer wall 14, a front end 16 and a back end 18. The outer wall 14 is continuous such that the fishing lure 12 has a substantially ovoid shape and the outer wall 14 has a top side 20. A chamber 22 is positioned within the fishing lure 12 and the chamber 22 may contain cremains 24. The fishing lure 12 includes a bill 26 and a pair of hooks 28.

A pair of windows 30 is provided and each of the windows 30 is coupled to the outer wall 14. Each of the windows 30 is comprised of a translucent material and each of the windows 30 is aligned with the chamber 22. Thus, the cremains 24 in the chamber 22 are visible to an observer. Each of the windows 30 is positioned on oppositionally positioned on the fishing lure 12. Indicia 32 may be printed on each of the windows 30. The indicia 32 may comprise words and the words may comprise a memorial to a deceased person.

A sleeve 34 is coupled to the fishing lure 12. The sleeve 34 extends through the outer wall 14 and into the chamber 22. Thus, the sleeve 34 may fill the chamber 22 with the cremains 24. The sleeve 34 has a distal end 36 with respect to the chamber 22. The distal end 36 is exposed on the top side 20 of the fishing lure 12.

A cap 38 is removably coupled to the sleeve 34 and the cap 38 retains the cremains 24 in the chamber 22. The cap 38 is positioned on the distal end 36 of the sleeve 34. The cap 38 forms a fluid impermeable seal with the sleeve 34. Thus, the cremains 24 are inhibited from becoming wet when the fishing lure 12 is cast into the body of water.

In use, the cap 38 is removed from the sleeve 34 and the cremains 24 are poured into the chamber 22. The cap 38 is replaced on the sleeve 34. The fishing lure 12 is repeatedly cast into the body of water in the convention of fishing. Thus, the deceased person is memorialized when the fishing lure 12 is used for fishing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cremains storage assembly being combined with a fishing lure, said assembly comprising:

said fishing lure being configured to be cast into a body of water, said fishing lure being configured to contain cremains;

a sleeve being coupled to said fishing lure wherein said sleeve is configured to fill said fishing lure with the cremains;

a cap being removably coupled to said sleeve wherein said cap is configured to retain the cremains in said fishing lure;

wherein said fishing lure has an outer wall, a front end and a back end, said outer wall being continuous such that said fishing lure has a substantially ovoid shape, said outer wall having a top side, said fishing lure having a chamber being positioned within said fishing lure wherein said chamber is configured to contain the cremains; and wherein said sleeve extends through said outer wall and into said chamber wherein said sleeve is configured to fill said chamber with the cremains, said sleeve having an distal end with respect to said chamber, said distal end being exposed on and extending above said top side of said fishing lure.

2. The assembly according to claim 1, further comprising a pair of windows, each of said windows being coupled to said outer wall, each of said windows being aligned with said chamber wherein each of said windows is configured to facilitate the cremains in said chamber to be visible to an observer, each of said windows being oppositionally positioned on said fishing lure.

3. A cremains storage assembly being combined with a fishing lure, said assembly comprising:

said fishing lure being configured to be cast into a body of water, said fishing lure having an outer wall, a front end and a back end, said outer wall being continuous such that said fishing lure has a substantially ovoid shape, said outer wall having a top side, said fishing lure having a chamber being positioned within said fishing lure wherein said chamber is configured to contain cremains;

a pair of windows, each of said windows being coupled to said outer wall, each of said windows being aligned with said chamber wherein each of said windows is configured to facilitate the cremains in said chamber to be visible to an observer, each of said windows being oppositionally positioned on said fishing lure;

a sleeve being coupled to said fishing lure, said sleeve extending through said outer wall and into said chamber wherein said sleeve is configured to fill said chamber with the cremains, said sleeve having an distal end with respect to said chamber, said distal end being exposed on said top side of said fishing lure; and a cap being removably coupled to said sleeve wherein said cap is configured to retain the cremains in said chamber, said cap being positioned on said distal end of said sleeve.

\* \* \* \* \*